United States Patent [19]

Dworak et al.

[11] Patent Number: 4,975,397
[45] Date of Patent: Dec. 4, 1990

[54] SINTERED MOLDING, A METHOD FOR PRODUCING IT AND ITS USE

[75] Inventors: Ulf Dworak, Baltmannsweiler; Hans Olapinski, Aichwalt; Wolfgang Burger, Wernau, all of Fed. Rep. of Germany

[73] Assignee: Feldmuehle Aktiengesellschaft, Düsseldorf, Fed. Rep. of Germany

[21] Appl. No.: 19,397

[22] Filed: Feb. 26, 1987

Related U.S. Application Data

[63] Continuation-in-part of Ser. No. 850,245, Apr. 10, 1986, abandoned.

[30] Foreign Application Priority Data

Apr. 13, 1985 [DE] Fed. Rep. of Germany ....... 3513341
Oct. 10, 1986 [DE] Fed. Rep. of Germany ....... 3634588

[51] Int. Cl.$^5$ ............................................. C04B 35/48
[52] U.S. Cl. ................... 501/104; 501/103; 501/105; 501/120; 501/152
[58] Field of Search ............... 501/103, 104, 105, 120, 501/152

[56] References Cited

U.S. PATENT DOCUMENTS

| | | | |
|---|---|---|---|
| 4,067,745 | 1/1978 | Garvie et al. | 501/104 |
| 4,279,655 | 7/1981 | Garvie et al. | 423/265 X |
| 4,344,904 | 8/1982 | Yamada | 501/104 X |
| 4,360,598 | 11/1982 | Otagiri et al. | 501/152 X |
| 4,520,114 | 5/1985 | David | 501/12 |
| 4,544,607 | 10/1985 | Nagoya et al. | |
| 4,565,792 | 1/1986 | Knapp | 501/104 X |
| 4,587,225 | 5/1986 | Tsukuma et al. | 501/104 X |
| 4,659,680 | 4/1987 | Guile | 501/152 X |

FOREIGN PATENT DOCUMENTS

| | | | |
|---|---|---|---|
| 8032066 | 2/1983 | Japan | 501/105 |
| 8036976 | 3/1983 | Japan | 501/104 |
| 8049663 | 3/1983 | Japan | 501/104 |
| 83/04247 | 12/1983 | PCT Int'l Appl. | |

OTHER PUBLICATIONS

"Mechanisms of Toughening Partially Stabilized Zirconia (PSZ)" by D. L. Porter and A. H. Heuer, Journal of The American Ceramic Society-Discussions and Notes, Mar.-Apr. 1977, vol. 60, pp. 183-184.

*Primary Examiner*—Karl Group
*Attorney, Agent, or Firm*—Felfe & Lynch

[57] ABSTRACT

The present invention is in a sintered molding of partially stabilized zirconium oxide having a microstructure of 40 to 70 volume percent cubic phase, 30 to 70 volume percent tetragonal phase, and up to 10 volume percent monoclinic phase wherein the tetragonal phase is present in the form of precipitates less than 200 nm. A mixture of magnesia and yttria is used to stabilize the zirconia. Optionally, the sintered molding may further contain up to 20 wt. % spinel.

28 Claims, No Drawings

SINTERED MOLDING, A METHOD FOR PRODUCING IT AND ITS USE

This specification is a continuation-in-part of U.S. Ser. No. 850,245, filed Apr. 10, 1986, now abandoned.

BACKGROUND OF THE INVENTION

The present invention relates to a sintered molding, consisting of partially stabilized zirconium oxide as the sole or principal component mixed with additional ceramic materials, in which magnesium oxide and yttrium oxide are uniformly distributed as stabilizing oxides, the crystal phase composition of the zirconium oxide including the cubic, tetragonal and monoclinic modifications, but the content of the monoclinic modification amounting to no more than 5% by volume of the total phase composition. The invention moreover relates to a method for the production of the sintered molding, and to its use. A sintered molding of partially stabilized zirconium oxide is known from DE-A-23 07 666 owned by the Assignee of the present invention. In addition to the magnesium oxide cited for the achievement of optimum properties, mention was made therein of yttrium oxide, along with the oxides of cerium, lanthanum, ytterbium, and titanium, as well as mixtures of these oxides, but without having in view any specific advantageous action of these additional oxides. For the achievement of an improved strength under high temperatures, this proposal is aimed at very high cubic phase contents ranging from 75 to 95%, without stating the nature of the rest of the phase contents. A flexural breaking strength of 63 kp/mm² corresponding to about 618 MPa is given as the maximum strength, but it has been found in the meantime that this very good strength is greatly reduced by extended thermal stress, so that in many cases this ceramic cannot be used. Another disadvantage lies in the complicated method of manufacture which sets out from prestabilized zirconium oxide, unstabilized zirconium oxide and stabilizing metal oxides.

A study of the use of different metal oxides in the stabilization of zirconium oxide is described in the article, "Stabilization of Zirconia with Combined Additives, A Study of the Solid Solution Stability" (published in "Refractories" (1970) pp. 723–726)). A mixture of 92 mol-% of zirconium oxide, 5 mol-% of magnesium oxide and 3 mol-% of yttrium oxide has, according to this study, an exclusively cubic modification, but with a strength of 2000 kg/cm² corresponding to 196 MPa. Thus, it is still well below the strength of the zirconium oxide described in DE-A-23 07 666.

In EP-A-13 599 a partially stabilized zirconium oxide is described in which nothing but magnesium oxide is provided as a stabilizing metal oxide, in the amount of 2.8 to 4% by weight. The phase composition of this zirconium oxide is given as 2 to 10 wt.-% tetragonal and 0.5 to 20 wt.-% monoclinic. Tetragonal and monoclinic phases are present as a segregation in grains consisting otherwise of the cubic modification. As it has been found on the basis of research, articles made of this partially stabilized zirconium oxide do not have a sufficient high-temperature stability for many applications.

A number of proposals have become known for improving the heat resistance of the known partially stabilized zirconium oxides. EP-A-36 786 provides for a partially stabilized zirconium oxide containing 2 to 7 mol-% of yttrium oxide as a stabilizing oxide in order to improve the high-temperature stability in the range from 200 to 300° C. Up to 30 mol-% of the yttrium oxide can be replaced by oxides of ytterbium, scandium, niobium, or samarium, or by calcium oxide or magnesium oxide. Also, up to 30 wt.-% of aluminum oxide, silicon oxide and aluminum silicate can also be added as additional ceramic substances. The crystal phase composition is given as cubic/tetragonal, cubic/tetragonal and up to 20 vol.-% monoclinic, tetragonal, tetragonal, and up to 20 vol.-% monoclinic or cubic, so that no precise conclusion can be made as regards the cubic/tetragonal percentages. To obtain the zirconium oxide in the tetragonal modification, provision is made according to EP-A-36 786 for the zirconium oxide to be present in the sintered molding in a grain size not exceeding 2 microns, and preferably the grain size is to be even less than 1 micron. To arrive at such a fine grain size, EP-A-36 787 provides for the use of zirconium oxide and of yttrium oxide starting compounds, i.e., for example, the corresponding chlorides, nitrates or oxalates, which are first mixed, then thermally decomposed, and then ground wet, in order to arrive at an extremely fine starting powder with which the production of a sintered molding of high density and sufficient strength with a grain size less than 2 microns is possible by using a sintering temperature below 1500° C. The important difference between the material described in EP-A-36 786 and the above-discussed partially stabilized zirconium oxides consists in the structure. Due to the extremely small grain size in conjunction with the relatively low sintering temperature, according to EP-A-36 786 a structure is obtained in which the individual grains of the structure are in the cubic or tetragonal, or even monoclinic modification, depending on their size and their content of stabilizing oxides.

This complicated method of production results in an extremely expensive starting material and has heretofore impeded the widespread use of sintered moldings consisting of this material. It has been found, furthermore, that the thermal load-bearing strength is often still unsatisfactory. Another disadvantage of this extremely fine-grained zirconium oxide material consists in its high rate of creep at high temperatures, which is about 1 to 2 powers of ten greater than it is in coarse-grained, partially stabilized zirconium oxide materials.

TZP ceramics are also described in the U.S. Pat. Nos. 4,544,607, 4,565,792 and 4,587,225 and in the Japanese Patent Publications Nos. 58-36976 and 58-32066. These proposals share the disadvantage that the strength of the respective materials falls off precipitously under high temperature conditions because, under such conditions, the crystals, which are present in the tetragonal modification, grow and are converted into the monoclinic modification.

According to another proposal disclosed in DE-A-33 45 659 for the improvement of the known sintered moldings of partially stabilized zirconium oxide, provision is made for coating a sintered molding with a more highly stabilized, thin layer or one that is mostly in the cubic phase. The base bodies can be either the so-called TZP zirconium oxide sintered bodies, as described in EP-A-36 786, or the common zirconium oxide ceramics stabilized with magnesium oxide described in EP-A 13 599. The contemplated improvement, however, relates only to a relatively low temperature range up to 400° C, at which the degradation process of the so-called TZP ceramics, occurring under the influence of moisture, is said to be limited by means of the proposed coating. A disadvantage of this proposal is the slight thickness of 0.1 to 200 microns, preferably 0.3 to 30 microns, of the outer protective coating. For if this coating is removed from parts subject to wear, the known disadvantages are to be expected. Another disadvantage lies in the difficulty of preparing precisely dimensioned parts, because the sintering process is mostly followed by a mechanical working of the sintered molding, e.g., by grinding its surface. An applied protective coating would in most cases be thus removed, even if its thickness were 200 microns. If the coating process described is used for a conventional zirconium oxide ceramic partially stabilized with magnesium oxide (Mg-PSZ), it can be assumed that only very small percentages of monoclinic phase can be measured at the surface, close to the protective coating, even after a relatively long exposure to high-temperature stress, while in the interior of the sintered object, that is, where the outer protective coating is of no influence, the decomposition or transformation to the monoclinic phase described even in the case of the known zirconium oxide ceramics partially stabilized with magnesium oxide will take place, since here a migration of magnesium oxide into the area of the grain boundary takes place.

In WO 83/04247 it has already been proposed to add to a zirconium oxide partially stabilized with 3 to 3.65 wt-% of MgO another 0.05 to 1 wt-% of strontium or barium oxide. In this disclosure both high-strength zirconium oxide ceramics and those which can be used at room temperature are described, as well as those which are usable at high temperature but may have a lower strength. The microstructure of the zirconium oxide ceramic, depending on the temperature range in which the ceramic is to be used, is to be such that the monoclinic zirconium oxide content, present as a segregation in the cubic matrix, will be higher as the temperature range in which the zirconium oxide ceramic is used is increased. For a zirconium oxide ceramic that can be used for brief periods at high temperatures, a monoclinic phase content of 35 to 65 vol-%, measured at the mirror-polished surface, is accordingly required. The monoclinic zirconium oxide content present at the grain boundaries can, in that case, amount to as much as 30 vol-%, but preferably to only 20 vol-%.

Although that disclosure refers to use of the refractory zirconium oxide produced therein at temperatures ranges exceeding 1000° C, no information regarding the flexural strengths found at such temperatures is contained therein.

The disadvantage of this material consists in the poor stability of shape at high temperatures. This can be understood because a high content of monoclinic segregations forms even in the making of the ceramic, and the size of the segregations still present in the tetragonal modification (phase) has already greatly increased. In the event of further thermal stress, on account of the growth of the tetragonal segregations which this entails, segregations at first still present in tetragonal modification are converted to the monoclinic modification, with an increase in volume.

Setting out from this state of the art, the problem to which the present invention is addressed consists in developing a sintered molding consisting of partially stabilized zirconium oxide or containing a partially stabilized zirconium oxide as the predominant component, which will have an excellent flexural strength and resistance to thermal shock even under the influence of high temperature, so that it will be possible to make components from such a zirconium oxide which can be used over a long period of time even at temperatures of more than 1000° C. The invention also aims to make available a zirconium oxide which will have good dimensional or shape stability at high temperatures. The invention also is in a manufacturing process of reasonable cost for the production of a partially stabilized zirconium oxide that has good shape stability.

THE INVENTION

For the solution of this problem, the invention provides a sintered molding, such as a compact or form body consisting of partially stabilized zirconium oxide with stabilizing oxides as the sole or predominant component mixed with additional ceramic substances: the stabilizing oxides being magnesium oxide and yttrium oxide which are homogeneously distributed in said article; and the crystal phase composition of the zirconium oxide includes the cubic, tetragonal and monoclinic modifications. After sintering, the amount of the segregations present in tetragonal modification is 30 to 60 volume-percent. In the cubic matrix grains, monoclinic segregations are also present in an amount up to 5, and preferably, from 2 to 5 volume-percent; balance: cubic modification, measured in each case at the mirror-polished surface. The tetragonal segregations have a size no greater than 200 nanometers (nm). The sintered compact contains, in addition to 0.5 to 3 wt-% of magnesium oxide, 1 to 5 wt-% of yttrium oxide, with respect in each case to the sintered compact. The sintered compact has an average grain size of 5 to 70 microns.

The solution of the problem to which the invention is addressed is therefore surprising since, according to WO 83/04247, it was considered indispensable for a zirconium oxide usable at high temperatures to have also a relatively high content of monoclinic zirconium oxide.

The present invention calls for substantially fine segregations, i.e., no greater than 200 nm, and preferably 20 to 150 nm. Probably the greater thermal stability, especially the good dimensional and shape stability, of the zirconium oxide products according to the invention, are believed to result because the segregations are very uniformly distributed and do not exceed 200 nm. In the case of segregations which are present to more than 5 vol-% in the monoclinic modification, there is the danger of a very rapid transformation of the segregations that are still present in tetragonal modification. On the other hand, operating in the range of less than 2 vol-% of monoclinic zirconium oxides would necessitate an excessively complex manufacturing process. Thus the range of 2 to 5 vol-% of the monoclinic modification is highly preferred. The sintered compacts may additionally contain 05 to 1 wt.-% of strontium oxide and/or barium oxide.

It is also of importance that the average grain size be from 5 to 70 microns. This grain size in the finished sintered compact avoids the disadvantages mentioned in the European patent EP-A-36786 discussed above for the achievement of the extremely fine starting powder, and, contrary to warnings concerning the avoidance of great grain growth, it still permits the presence of relatively coarse grains.

The present invention thus makes available a sintered molding which has a greater resistance to high temperatures than the fine-grained, so-called TZP-$ZrO_2$ ceramics according to EP-A-36 786, and also than the coarsergrained ZrO$_2$ ceramics partially stabilized, usually, on the basis of MgO.

In particular when used in the temperature range of approximately 1000° C. and above, the inventive sintered molding exhibits an excellent high temperature stability which has not been achieved by the hitherto known sintered moldings. Although the known sintered moldings could be used at relatively low temperatures for a longer time, the maximally achievable temperature range did not exceed 900° C and for many uses, the maximum temperature range had to be established considerably lower. In evaluating the temperature use, it must be considered that predominantly the upper range of the effective temperatures, and to a considerably lesser degree the length of exposure time, have an effect on the stability of strength of the sintered article or compact.

In addition to the improved resistance to thermal stress, the invention offers the advantage over the TZP ceramics that the difficult and costly practices of co-precipitation and thermal decomposition can be avoided in the preparation of the starting powder from zirconium oxide and stabilizing oxides.

In the production of the basically coarse-grained ZrO$_2$ ceramics, which also include the sintered moldings of the present invention, the oxides of magnesium, calcium and yttrium have already been proposed in general, but without a specific ratio of admixture, and mainly for the purpose of achieving the highest possible content of the cubic phase. The present invention, by the very special ratio of admixture of the oxides of magnesium mixed with yttrium oxide, permits the production of a sintered molding which, due to its phase composition, has a satisfactory strength, which in some cases even increases slightly under relatively long exposure to high temperatures.

For the production of the sintered molding, the commercially available powders of the different oxides can be used, after they have been subjected to a known grinding process. Although a considerable grain growth is observed during the sintering process, the sintered molding does have the described high strength and high-temperature stability.

The expression, "mirror-polished", used in connection with the present disclosure means that after sintering the sintered molding was subjected to a polishing operation in which a mirror-smooth surface is produced. The measurement of the crystal phases is performed at the polished surface by the X-ray diffraction method. The data given on the crystal phase composition relate to the sintered molding before exposure to high-temperature stress.

The term "homogeneous distribution", used in connection with the present invention means that the stabilizing oxides are uniformly distributed over the cross section of the sintered object.

For the achievement of especially high strengths, it can be advantageous for the sintered molding to contain, in addition to the partly stabilized zirconium oxide, one or more ceramic substances in an amount of 5 to 20% by weight. In this case, however, it is essential that these additional materials are not reactive to the components of the partly stabilized zirconium oxide.

According to another preferred embodiment, the stabilizing of the zirconium oxide is accomplished with a mixture of stabilizing oxides corresponding to a mathematical addition of about 2.6 to 4.0%, and very especially preferably 2.9 to 3.6%, by weight of magnesium oxide, the mixture consisting also of yttrium oxide in addition to magnesium oxide, and 10 to 70% of the additional amount of partially stabilizing oxides, mathematically reckoned with respect to magnesium oxide, is replaced by a gram-equivalent amount of yttrium oxide. According to an additional preferred embodiment, the degree of substitution of the magnesium oxide in that case is 20 to 50%.

In the invention, the content of the tetragonal modification of the zirconium oxide amounts to 30 to 60% by volume. The sintered molding has a content of the monoclinic modification of less than 5%, and preferably 2 to 5% by volume, with respect to the total crystal phase of the partially stabilized zirconium oxide. Such a sintered molding has an especially high strength even after long exposure to high temperatures. The strength can be increased still further by simultaneously increasing the content of the tetragonal modification to more than 45% by volume and decreasing the content of the cubic modification. Such sintered products have a density of at least 5.75 gm/cm$^3$.

A substantially smaller grain size ranging from 5 to 20 microns and especially 7 to 15 microns can be achieved if the sintered molding, in an additional embodiment, contains, in addition to partly stabilized zirconium oxide, 5 to 20% by weight of a ceramic material which does not enter any reaction with the components of the partly stabilized zirconium oxide. The requirement of nonreactivity is essential, since it is necessary under all circumstances to avoid any influence on the phase composition of the partly stabilized zirconium oxide. Substances such as aluminum silicate and silicon dioxide are therefore unsuitable. However, spinel (MgAl$_2$O$_4$) has proven to be very suitable and is therefore preferred.

Such sintered compacts will have a density of at least 5.15 gm/cm$^3$. On the other hand, a preferred grain size range for a sintered compact consisting only of partially stabilized zirconium oxide and strontium oxide is from 55 to 70 microns.

The terms, "common commercial zirconium oxide powder", and "partially stabilized zirconium oxide" as described in the present invention, are to be understood to mean those compositions which contain a certain percentage of hafnium oxide, such as that which is unavoidably contained in most commercially available zirconium oxide powders. This percentage, however, should be preferably less than 2% of the weight of the zirconium oxide. It is also very important that the raw materials used contain the lowest possible amounts of other impurities, so that the sintered product will contain not more than 1.2%, and preferably not more than 0.8%, by weight, of miscellaneous impurities, but preferably a much lower percentage of such impurities. Such often unavoidable impurities include Fe$_2$O$_3$ and SiO$_2$.

A sintered molding according to the present invention which has a flexural breaking strength of more than 400 MPa even when subjected to heating at 1000° C. for 1000 hours has proven to be especially suitable, particularly for the production of component parts for internal combustion engines.

An especially suitable composition of stabilizing oxides, consisting of magnesium oxide, as well as yttrium oxide corresponding mathematically to 2.9 to 3.6% of the weight of the magnesium oxide, wherein 40 to 60% of the amount of stabilizing oxides added is replaced by a gram-equivalent amount of yttrium oxide, permits the manufacture of a sintered molding whose content of the monoclinic phase is less than 1% at room temperature and less than 10% after heating at 1400° C. for 150 hours. The flexural breaking strength σB of this sintered molding, after 150 hours at 1400° C., amounts to more than 400 MPa, i.e., there is virtually no loss of strength. Very particular importance is to be ascribed to the method of manufacturing the sintered molding according to the invention. First, zirconium oxide is mixed with a mixture of stabilizing oxides which corresponds to a mathematical additional amount of 2.5 to 4.5% of magnesium oxide, with respect to the total composition of the partially stabilized zirconium oxide, and the mixture consists also of yttrium oxide in addition to magnesium oxide. 10 to 70% of the amount of stabilizing oxides added, with respect mathematically to magnesium oxide, is replaced by a gram-equivalent amount of yttrium oxide. Alternatively, one or more ceramic materials can be added in the amount of 5 to 20% by weight to the mixture of zirconium oxide and stabilizing oxides, but they must not be reactive to the components of the partially stabilized zirconium oxide. The resultant mixture is ground wet, with the addition of a dispersing agent, preferably to a particle size $D_{50}$ of 0.7 to 1.5 microns.

After the ground mixture has been spray-dried, a compact is pressed from the powder mixture and heated to a temperature sufficient for the production of the cubic phase, of at least 1600° C., preferably at a rate of 80 to 130° C. per hour. After a holding time of 0.5 to 5 hours, the sintered compact is tempered in the two-phase cubic/tetragonal range for the production of tetragonal precipitates in the matrix grains present in the cubic phase. The temperature can be controlled during the cooling phase such that the body is cooled down to room temperature at a rate of 250° C. per hour to 400° C. per hour, and the tempering is performed during this cooling phase.

The two-phase cubic-tetragonal temperature range in which the cubic and tetragonal phase are side by side can be derived from the phase diagrams of the systems $ZrO_2/MgO$, and $ZrO_2/Y_2O_3$. For example, with respect to 3 wt.-% of MgO, the two-phase temperature range is between about 1400 and 1800° C.

The size of the segregations within the cubic matrix grain is very substantially affected by the temperature management during the cooling process. It is important in any case that the sintered compact according to the invention is not subjected, after the sintering and cooling process has ended and before it is used in the high-temperature range, to any temperatures which produce a growth of the tetragonal segregations above 200 nm or an increase of the monoclinic segregations above 5% by volume. Preferably, the tetragonal segregations are present in a size of 20 to 150 nm.

The segregations described in connection with the present invention are in the form of an elliptical spheroid. The size data refer to its greatest diameter. In the other two directions the spheroid has a substantially smaller dimension, i.e., a dimension that is about three times smaller.

Sintered compacts according to the invention have a flexural strength σB which amounts, after a temperature stress of 1000 h at 1000° C., to
  (a) greater than 400 MPa, measured at room temperature,
  (b) greater than 200 MPa, measured at 1000° C.

The sintered molding according to the invention is used advantageously wherever it is expected to be exposed to heat of more than 900° C. It is therefore especially suited for components that are to be used for long periods in this temperature range. Such application especially include: oxygen measuring probes, such as lambda probes; piston heads, plates for cylinder heads and valve guides; and also forming tools such as drawing dies. Components in which thermal insulation is important are made preferably of a sintered material which consists of 90 to 100% of a partly stabilized zirconium oxide according to the present invention.

On the other hand, for components of especially high resistance to breakage, a sintered molding composition of partially stabilized zirconium oxide and spinel in an amount of up to 20 wt.-% has proven to be especially suitable.

EXAMPLES OF PREFERRED EMBODIMENTS

The following Examples, as well as the Standard Examples 1 to 3 given for comparison, will serve for the further explanation of the invention, although the invention is not limited to the embodiments described therein.

In the Examples, the preparation of the powder consisted in wet-grinding the powder mixture in a ball mill to a particle size $D_{50}$ of approximately 1 micron. After a polyvinyl alcohol solution was added as binding agent, the powder was spray-dried, compacts were pressed from the spray-dried powder, and were heated at a rate of 100° C. per hour, maintained at 1770° C. for 5 hours, and cooled at a rate of 300° C. per hour. The stated breaking strengths were measured at room temperature, after the described exposure to thermal stress on test bars with a cross section of 3.5×4 mm and a length of 45 mm, by the four-point method.

STANDARD EXAMPLE 1

In this Example a powder mixture of the following composition was used:

| 1.76% by weight | MgO |
|---|---|
| 0.36% by weight | $Y_2O_3$ |
| 97.88% by weight | $ZrO_2$. |

A cubic-phase content of approximately 50% and a monoclinic-phase content of about 60% were measured. The flexural breaking strength σB was determined to be 95 MPa at room temperature and thus is very low.

STANDARD EXAMPLE 2

A powder mixture of 3.2 wt.-% MgO, corresponding to 9.18 mol-%, and 96.8 wt.-% $ZrO_2$ was used, and the phase percentages of the partly stabilized zirconium oxide were determined as follows:

| monoclinic modification | 6% |
|---|---|
| tetragonal modification | 44% |
| cubic modification | 50% average |
| grain size | 60 microns |

The flexural breaking strength σB was found to be 500 MPa and thus is substantially better than in Standard Example 1. After exposure to 1000° C. for 1000 hours, however, the flexural breaking strength was found to have decreased to 280 MPa, while the content of the monoclinic modification had increased to more than 80%. At the same time the density, at 5.65 g/cm³, was found to be lower than the initial density of 5.73 g/cm$^3$.

STANDARD EXAMPLE 3

A mixture of
4.5 wt.-% MgO
2 wt.-% Y$_2$O$_3$
balance ZrO$_2$
was used.

The sintered molding prepared has a phase consisting 100% of the cubic modification, but has a very low flexural breaking strength $\sigma$B of 150 MPa. The average grain size is 50 microns.

EXAMPLE 1

The following powder mixture is used:
3 wt.-% MgO
1 wt.-% Y203
96 wt.-% ZrO$_2$ 10.4% of the magnesium oxide was replaced with a gram-equivalent amount of yttrium oxide, with reference to the total amount of stabilizing oxides.

The percentages found for the individual modifications of the partly stabilized zirconium oxide are approximately:

|  |  |
|---|---|
| monoclinic | 3% |
| tetragonal | 50% |
| cubic | 47%. |

The sintered molding has a density of 5.8 g/cm$^3$ and a flexural bending strength $\sigma$B of 500 MPa. The average grain size is about 55 microns.

After a thermal stress of 1000° C., the body has a flexural strength $\sigma$B of 515 MPa. The monoclinic modification content is less than 10%. At the same time the density remains unchanged at 5.8 g/m$^3$. The size of the tetragonal precipitate is of the order of 180 nm.

EXAMPLE 2

The following powder mixture is used:
2.3 wt.-% MgO
3.2 wt.-% Y203
94.5 wt.-% ZrO$_2$ The average grain size is 56 microns. 33% of the MgO was replaced by a gram-equivalent amount of Y$_2$O$_3$.

The body has a flexural breaking strength $\sigma$B of 600 MPa and has the following percentage contents of the individual modifications:

|  |  |
|---|---|
| monoclinic modification | 2% |
| tetragonal modification | 50% |
| cubic modification | 48% |

The density is 5.85 g/cm$^3$.

After 1000° C. for 1000 hours there is no change in the breaking strength, phase composition or density.

The effect of the heat stress at 1100° C. is indicated by the following table:

TABLE

| Time (h) | Density (g/cm$^3$) | Flexural breaking strength (MPa) | Monoclinic modification content, % |
|---|---|---|---|
| 10 | 5.85 | 535 | less than 5 |
| 30 | 5.84 | 514 | less than 5 |
| 100 | 5.84 | 551 | less than 5 |
| 700 | 5.84 | 627 | less than 9 |

The size of the tetragonal precipitate was of the order of 150 nm.

EXAMPLE 3

The following powder mixture is used:
2 wt.-% MgO
3 wt.-% Y$_2$O$_3$
85 wt.-% ZrO$_2$
10 wt.-% spinel (MgAl$_2$O$_4$)
The average grain size is 11.7 microns.

35% of the MgO stabilization was replaced by a gram-equivalent amount of Y$_2$O$_3$.

The body has a flexural breaking strength $\sigma$B of 670 MPa. The partly stabilized zirconium oxide has the following modifications:

|  |  |
|---|---|
| monoclinic modification | 3% |
| tetragonal modification | 41% |
| cubic modification | 56% |

The density is 5.47 g/cm$^3$.

After 1000° C. for 1000 hours, there is no change in the breaking strength, the phase composition or the density.

The effect of the thermal stress at 1100° C. is shown by the following table:

TABLE

| Time (h) | Density (g/cm$^3$) | Breaking strength (MPa) | Monoclinic modification content, % |
|---|---|---|---|
| 0 | 5.47 | 670 |  |
| 10 | 5.47 | 740 |  |
| 30 | 5.47 | 800 | less than 5 |
| 100 | 5.44 | 790 |  |
| 300 | 5.43 | 830 |  |

The size of the tetragonal precipitate was of the order of 140 nm.

EXAMPLE 4

The following powder mixture is employed:

|  |  |
|---|---|
| 2.5 wt. % | MgO |
| 1.6 wt. % | Y$_2$O$_3$ |
| 10 wt. % | MgAl$_2$O$_4$ |
| 85.9 wt. % | ZrO$_2$ |

18.7% of the magnesium oxide stabilizer was replaced with a gram-equivalent amount of yttrium oxide.

The effect of the thermal stress at 1000° C. is shown by the following table:

TABLE

| Time (h) | Density (g/cm$^3$) | Breaking strength (MPa) | Monoclinic modification content, % |
|---|---|---|---|
| 0 | 5.48 | 610 | 3 |
| 10 | 5.47 | 610 | 3 |
| 100 | 5.46 | 630 | 3 |
| 500 | 5.48 | 660 | 4 |
| 1000 | 5.46 | 650 | 4 |

The size of the tetragonal precipitate was of the order of 170 nm.

EXAMPLE 5

The following powder mixture is used:

| | |
|---|---|
| 2.5 wt. % | magnesium oxide |
| 1.9 wt. % | yttrium oxide |
| 0.3 wt. % | strontium oxide |
| 95.3 wt. % | zirconium oxide. |

The effect of the thermal stress up to 1000° C. is to be seen in the following table:

TABLE

| Time (h) | Density (g/cu cm) | Breaking strength (MPa) | Contents of the monoclinic modification |
|---|---|---|---|
| 24 | 5.83 | 623 | 1 |
| 500 | 5.82 | 661 | 4 |
| 700 | 5.81 | 621 | 4 |
| 1000 | 5.82 | 638 | 4 |

The above data were obtained at room temperature. The flexural strength $\sigma B$ measured at a 1000° C. after 1000 hours is 220 MPa.

From the data on the density and the data on the monoclinic contents it is to be seen that the compacts undergo virtually no change in shape even under severe heat stress, and thus have an excellent stability of shape.

The size of the tetragonal precipitate was of the order of 150 nm.

EXAMPLE 6

The following powder mixture is used:

| | |
|---|---|
| 1.8 wt. % | magnesium oxide |
| 3.8 wt. % | yttrium oxide |
| 0.5 wt. % | strontium oxide |
| 93.9 wt. % | zirconium oxide |

The effect of the thermal stress at temperatures from 1300° C. to 1400° C. is as in the following tables:
Thermal stress at 1300° C

| Time (h) | Density (g/cu cm) | Breaking strength (MPa) | Contents of the monoclinic modification |
|---|---|---|---|
| | Thermal stress at 1300° C. | | |
| 120 | 5.86 | 552 | 2 |
| 300 | 5.87 | 567 | 5 |
| | Thermal stress at 1400° C. | | |
| 120 | 5.87 | 539 | 4 |
| 150 | 5.87 | 557 | 5 |

The above data were obtained at room temperature. The flexural strength $\sigma B$ measured at 1000° C. after 1000 hours is 220 MPa. As in the preceding example, here again the densities and the contents of the monoclinic modification indicate that the sintered compacts have a high stability of shape. The size of the tetragonal precipitate was of the order of 60 nm.

It will be understood that the specification and examples are illustrative but not limitative of the present invention and that other embodiments within the spirit and scope of the invention will suggest themselves to those skilled in the art.

We claim:

1. A sintered article, consisting essentially of partially stabilized zirconium oxide with stabilizing oxides as the sole or predominant component; the stabilizing oxides being magnesium oxide and yttrium oxide which are homogeneously distributed in said article; the sintered article having a microstructure, which consists essentially of matrix grains formed from the partially stabilized zirconium oxide, in which tetragonal and monoclinic $ZrO_2$ precipitates are present, the monoclinic precipitates being present in an amount of up to 10 volume percent and the tetragonal precipitates being present in an amount of 40 to 70 volume percent, the remainder of the matrix grains being cubic $ZrO_2$, in each case as measured at a mirror-bright polished surface, the proportions of the individual $ZrO_2$ forms adding up to 100 volume percent the tetragonal precipitates being of a size no greater than 200 nm, the zirconium oxide being stabilized with a mixture of oxides which corresponds to a calculated added amount of 2.5 to 4.5 wt.-% of magnesium oxide with respect to the total composition of the partially stabilized zirconium oxide, and wherein the mixture of the stabilizing oxides consists in addition to magnesium oxide also of yttrium oxide, and the amount of magnesium oxide, being substituted, in the amount of 10 to 70%, by a gram-equivalent amount of yttrium oxide.

2. The sintered article of claim 1 wherein the sintered article consists of a partially stabilized zirconium oxide which, as the mixture of stabilizing oxides, contains, in addition to magnesium oxide, an amount of yttrium oxide wherein the amount of stabilizing oxides corresponds to 1.3 to 3.55 wt.-% of magnesium oxide, and 1.39 to 6.06 wt.-% of yttrium oxide, and the sintered article furthermore having, at room temperature, a content of the monoclinic phase of less than 1% and, after thermal stress for 150 h and 1400° C., a monoclinic phase content less than 10% and a flexural breaking strength greater than 400 MPa.

3. A sintered form body consisting essentially of partially stabilized zirconium oxide which contains as a stabilizing oxide a mixture of 0.5 to 4.1 weight percent of magnesium oxide and 0.7 to 8.4 weight percent of yttrium oxide, whereby the total portion of stabilizing oxides correspond to an additional amount which is equivalent to 2.5 to 4.5 MgO and the oxides of magnesium and yttrium are distributed homogeneously in the zirconium oxide before sintering, the body after sintering having a microstructure of zirconium oxide grains, being 5 to 70 $\mu$m in average size, in which tetragonal and monoclinic $ZrO_2$ precipitates are present, the monoclinic precipitates being present in an amount of 2 to 5 volume percent and the tetragonal precipitates being present in an amount of 30 to 60 volume percent and having a size no greater than 200 nm and the remainder of the grains being cubic $ZrO_2$, in each case as measured at a mirror-bright polished surface, the proportions of the individual $ZrO_2$ forms adding up to 100 volume percent.

4. The sintered form body of claim 3 wherein the grains, formed from the partially stabilized zirconium oxide have a size of from 55 to 70 $\mu$m.

5. The sintered form body of claim 3 wherein the partially stabilized zirconium oxide contains a mixture of the stabilizing oxides which corresponds to an amount of 0.76 to 3.58 wt.-% MgO and 0.73 to 7.47 wt.-% $Y_2O_3$.

6. The sintered form body of claim 3 wherein the partially stabilized zirconium oxide contains a mixture of the stabilizing oxides which corresponds to an amount of 0.84 to 3.22 wt.-% of MgO and 0.81 to 6.75 wt.-% of $Y_2O_3$.

7. The sintered form body of claim 3 having a flexural strength σB which, after a temperature stress of 1000 h at 1000° C., is
   (a) >400 MPa, measured at room temperature
   (b) >200 MPa, measured at 1000° C.

8. The sintered body of claim 3 containing 0.7 to 3 wt.-% MgO and 1 to 5 wt.-% $Y_2O_3$.

9. The sintered body of claim 3 wherein the precipitates have a form of an elliptical spheroid.

10. The sintered body of claim 9 wherein the elliptical spheroid has a larger dimension and a smaller dimension and the ratio of the larger to the smaller is approximately 3.

11. The sintered body of claim 3 having a minimum density of 5.75 gm/cm$^3$.

12. The sintered body of claim 3 wherein MgO is 1.3 to 3.55 wt.-% and $Y_2O_3$ is 1.39 to 6.06 wt.-%.

13. The sintered body of claim 3 wherein MgO is 0.84 to 2.11 wt.-% and $Y_2O_3$ is 3.18 to 6.75 wt.-%.

14. The sintered body of claim 3 wherein the yttrium oxide is present in an amount of 2 to 4.5 wt.-%.

15. The sintered body of claim 3 wherein the tetragonal precipitates are present in a size of 20 to 280 nm.

16. The sintered body of claim 15 wherein the tetragonal precipitates are present in a size of 50 to 180 nm.

17. The sintered body of claim 2 wherein the zirconium oxide is stabilized with a mixture of oxides which corresponds to a calculated added amount of 2.5 to 4.5 wt.-% of magnesium oxide with respect to the total composition of the partially stabilized zirconium oxide, and wherein the mixture of the stabilizing oxides consists in addition to magnesium oxide, also of yttrium oxide, the amount of magnesium oxide, being substituted, in the amount of 10 to 70%, by a gram-equivalent amount of yttrium oxide.

18. The sintered body of claim 3 worked to form an article.

19. The sintered body of claim 18 wherein the article is selected from the group consisting of drawing dies, isothermic dies for the shaping of metals, piston troughs, plates for cylinder heads, valve guides, cylinder linings, and oxygen measuring probes.

20. A process for the production of a sintered body consisting essentially of partially stabilized zirconium oxide comprising: wet grinding a powder mixture of zirconium oxide with magnesium oxide and yttrium oxide, the magnesium oxide being present in an amount of 0.5 to 4.1 wt.-% and yttrium oxide in an amount of 0.7 to 8.4 wt.-%, with respect to the total composition of the partially stabilized zirconium oxide in the sintered body, whereby the total portion of stabilizing oxides corresponds to an additional amount which is equivalent to 2.5 to 4.5 MgO to form a wet ground mixture; spray drying the wet ground mixture to obtain a spray dried mixture; pressing the spray dried mixture to form a body; heating the body to a sufficient temperature, of at least 1600° C., for the production of the cubic phase; and, with a holding time of at least 0.5 h, cooling down the heated body to room temperature at a cooling rate of 250° C./h to 400° C./h the sintered body having a microstructure of matrix grains, formed from the partially stabilized zirconium oxide and being 5 to 70 μm in average size, in which tetragonal and monoclinic $ZrO_2$ precipitates are present, the monoclinic precipitates being present in an amount of 2 to 5 volume percent and the tetragonal precipitates being present in an amount of 30 to 60 volume percent and having a size no greater than 200 nm and the remainder of the matrix grains being cubic $ZrO_2$, in each case as measured at a mirror-bright polished surface, the proportions of the individual $ZrO_2$ forms adding up to 100 volume percent.

21. The process of claim 20 wherein spinel is added to the mixture in such an amount that the body contains 5 to 20% spinel by volume.

22. The process of claim 20 wherein 0.05 to 1 wt.-% strontium and/or barium oxide is added to the mixture.

23. The process of claim 20 wherein the amount of MgO is 0.7 to 3 wt.-% and the amount of $Y_2O_3$ is 1.0 to 5 wt.-%.

24. The process of claim 20 wherein a dispersing agent is added to the powder mixture for wet grinding.

25. A sintered form body consisting essentially of zirconium oxide, partially stabilized with a mixture of 0.5 to 4.1 weight percent of magnesium oxide and 0.7 to 8.4 weight percent of yttrium oxide, and having been formed by homogeneously distributing the oxides of magnesium and yttrium in the zirconium oxide before sintering, the body after sintering having a microstructure, of matrix grains, formed from the partially stabilized zirconium oxide and being 7 to 15 μm in average size, in which tetragonal and monoclinic $ZrO_2$ precipitates are present, the monoclinic precipitates being present in an amount of 2 to 5 volume percent and the tetragonal precipitates being present in an amount of 30 to 60 volume percent and having a size smaller than 200 nm and the remainder of the matrix grains being cubic $ZrO_2$, in each case as measured at a mirror-bright polished surface, the proportions of the individual $ZrO_2$ forms adding up to 100 volume percent and spinel in an amount of 5 to 20% by volume of the sintered body as an additional ceramic substance.

26. The sintered body of claim 25 having a minimum density of 5.15 gm/cm$^3$.

27. A sintered form body of zirconium oxide, partially stabilized with a mixture of 0.5 to 4.1 weight percent of magnesium oxide and 0.7 to 8.4 percent of yttrium oxide, and having been formed by homogeneously distributing the oxides of magnesium and yttrium in the zirconium oxide before sintering, the body after sintering having a microstructure, of matrix grains, formed from the partially stabilized zirconium oxide and being 5 to 70 μm in average size, in which tetragonal and monoclinic $ZrO_2$ precipitates are present, the monoclinic precipitates being present in an amount of 2 to 5 volume percent and the tetragonal precipitates being present in an amount of 30 to 60 volume percent and having a size smaller than 200 nm and the remainder of the matrix grains being cubic $ZrO_2$, in each case as measured at a mirror-bright polished surface, the proportions of the individual $ZrO_2$ forms adding up to 100 volume percent, the sintered body also including 0.05 to 1 wt.-% strontium oxide and/or barium oxide.

28. The sintered body of claim 27 wherein the matrix grains, formed from the partially stabilized zirconium oxide have a size of from 55 to 70 μm.

* * * * *